United States Patent [19]

Bruskewitz

[11] Patent Number: 5,044,961
[45] Date of Patent: Sep. 3, 1991

[54] CHILD ACTIVITY TIMER

[76] Inventor: Eileen Bruskewitz, 505 Merrill Crest Dr., Madison, Wis. 53705

[21] Appl. No.: 598,912

[22] Filed: Oct. 16, 1990

[51] Int. Cl.⁵ ............................................. G09B 19/12
[52] U.S. Cl. ................................... 434/304; 446/397; 368/45; 368/223; 368/233
[58] Field of Search ............... 434/108, 238, 304, 365, 434/384, 404; 368/15, 16, 17, 18, 19, 45, 89, 97, 223, 224, 225, 229, 231, 233, 234; 446/236, 243, 397; 40/495

[56] References Cited

U.S. PATENT DOCUMENTS

| | | | |
|---|---|---|---|
| 372,074 | 10/1887 | Kuhn | 368/233 X |
| 586,366 | 7/1897 | Peterson et al. | 368/233 X |
| 2,305,283 | 12/1942 | Theilkas | 434/238 X |
| 2,891,378 | 6/1959 | Ducommun | 368/229 |
| 2,926,487 | 3/1960 | Stone | 368/97 X |
| 3,021,666 | 2/1962 | Stone | 368/97 X |
| 3,747,330 | 7/1973 | Tupone | 58/125 |
| 4,124,945 | 11/1978 | Totten | 434/304 |
| 4,759,002 | 7/1988 | Cash | 368/17 X |

OTHER PUBLICATIONS

1 page of commercially available children's clocks and timers.
Christophersen, Edward R., Little People: A Commonsense Guide to Child Rearing (3rd ed.), Westport Publishers, Inc., Kansas City, Mo. (1988), pp. 151-154.

Primary Examiner—Richard J. Apley
Assistant Examiner—L. Thomas
Attorney, Agent, or Firm—Carl E. Gulbrandsen

[57] ABSTRACT

A timer for teaching young children the concept of time is described. The timer includes a timing mechanism contained within a housing having a timer dial and activity selector. The timer dial permits selection of a duration of predetermined length and includes an indicator which moves in relation to a time scale to graphically illustrate the change in duration of length. The activity selector permits display of a graphic representation of the activity being timed or for which the child is waiting.

19 Claims, 6 Drawing Sheets

CHILD ACTIVITY TIMER

FIELD OF THE INVENTION

The present invention is in the field of child timers and methods for helping young children conceptualize time.

BACKGROUND OF THE INVENTION

The use of timers, primarily for "time-out" discipline with children is documented in early childhood books and articles. See, E. R. Christopherson, *Little People: A Commonsense Guide to Child Rearing* (3rd ed.) pp. 157-154, Westport Publishers, Inc., Kansas City (1988). Timers are used in the home, in the class room and child care settings. Timers can be used for marking time intervals for changes in activities, for example teaching children to share possessions, marking time until the lights are turned out at bedtime, watching television, or length of time necessary for brushing teeth.

While very young children (18 months to pre-school) do not understand or conceptualize time, they are beginning to learn about time. They learn to take turns and to wait for an event to begin or end, and they may have a "time-out" for inappropriate behavior. Forewarning a child about transitions in activities makes for an easier adjustment, cooperation and fewer arguments.

Most commonly the adult tells the child the timer will be set and uses the timer on the kitchen range or microwave. In such circumstances there is generally very little involvement of the child. If the child is of pre-school age she/he is too young to read or understand numbers and she/he must wait for either a buzzer to sound or for the parent to tell the child when the time is up.

What is needed is a child timer that can involve the child more in the timing process. It would be helpful to use a timer that is specifically designed for a child. It would be preferred if the timer could be operated by the child as well as the adult. The timer should have a timing indicator which provides a graphic measure of time and helps impart to the child the concept of the decreasing interval of time as the end of the timed event is approached. A timer for a pre-school child should have age appropriate timing intervals. In most circumstances age-appropriate timer intervals for a pre-schooler would be 2, 5, 10 or 15 minutes. It would also be preferred if the timer would also graphically illustrate for the child the activity being timed or for which the child is waiting.

Animated tooth brushing timers have been previously described. U.S. Pat. Nos. 2,926,487 and 3,021,666. These devices are, however, single event timers which are useful primarily for entertaining the child. Such timers do not provide a graphic measure of time for the child nor may they be effectively used for purposes other than tooth brushing.

The child timer of the present invention, satisfies the deficiencies of the above referenced timers. In addition the timer of the present invention satisfies a long felt need for a child timer which is simple for the child to use and understand while it helps the child grasp the difficult concept of time.

SUMMARY OF THE INVENTION

The present invention describes a child timer and method for teaching a young child the concept of time. The child timer of the invention comprises a timing mechanism contained within a housing having a timer dial and activity selector. The timer dial permits a duration of pre-determined length to be selected and an indicator which moves in relation to a time scale to graphically illustrate the change in duration length during said duration. The activity selector permits the display of a graphic representation of the activity being timed or the activity for which the child is waiting.

The novel features which are believed to be characteristic of the invention both as to its organization and method of operation, together with further objectives and advantages thereof, will be better understood from the following drawings in which a presently preferred embodiment of the invention is illustrated by way of example. It is to be expressly understood, however, that the drawings are for the purpose of illustration and description only and are not intended as a definition of the limits of the invention.

DETAILED DESCRIPTION OF THE INVENTION

EXAMPLE 1

Figure 1:
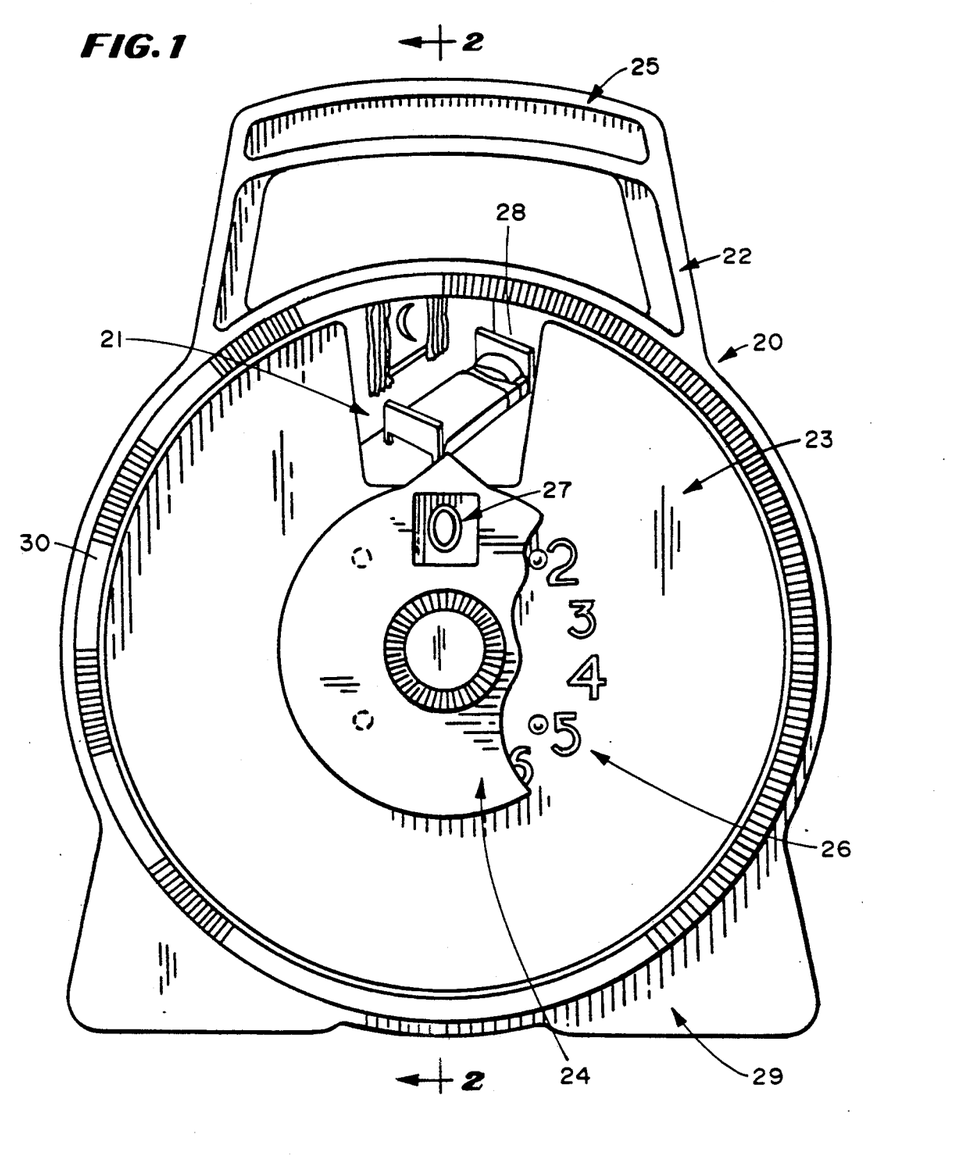
FIG. 1 is a front elevational view of one embodiment contemplated by the invention.
Figure 2:
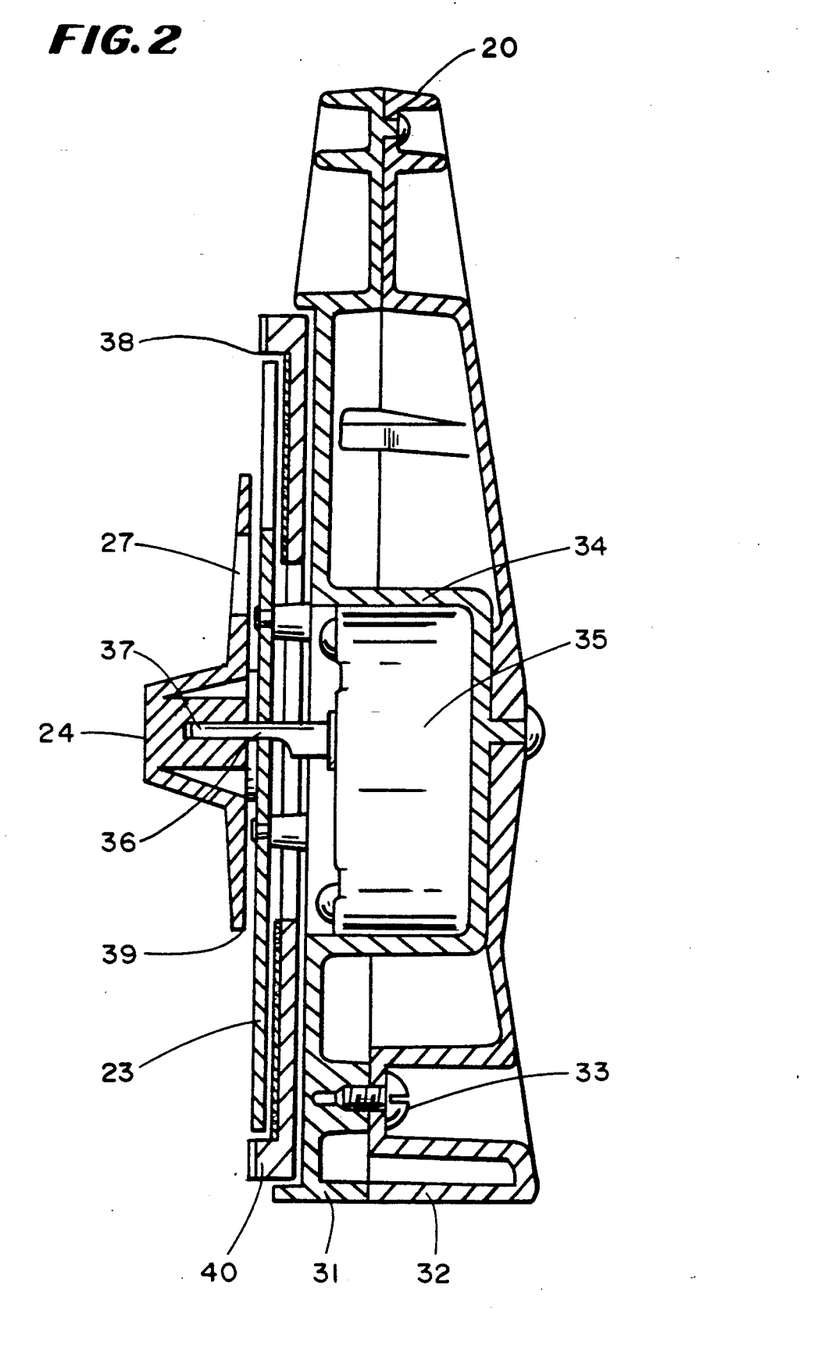
FIG. 2 is a cross sectional view taken on line 2—2 of FIG. 1.
Figure 3:
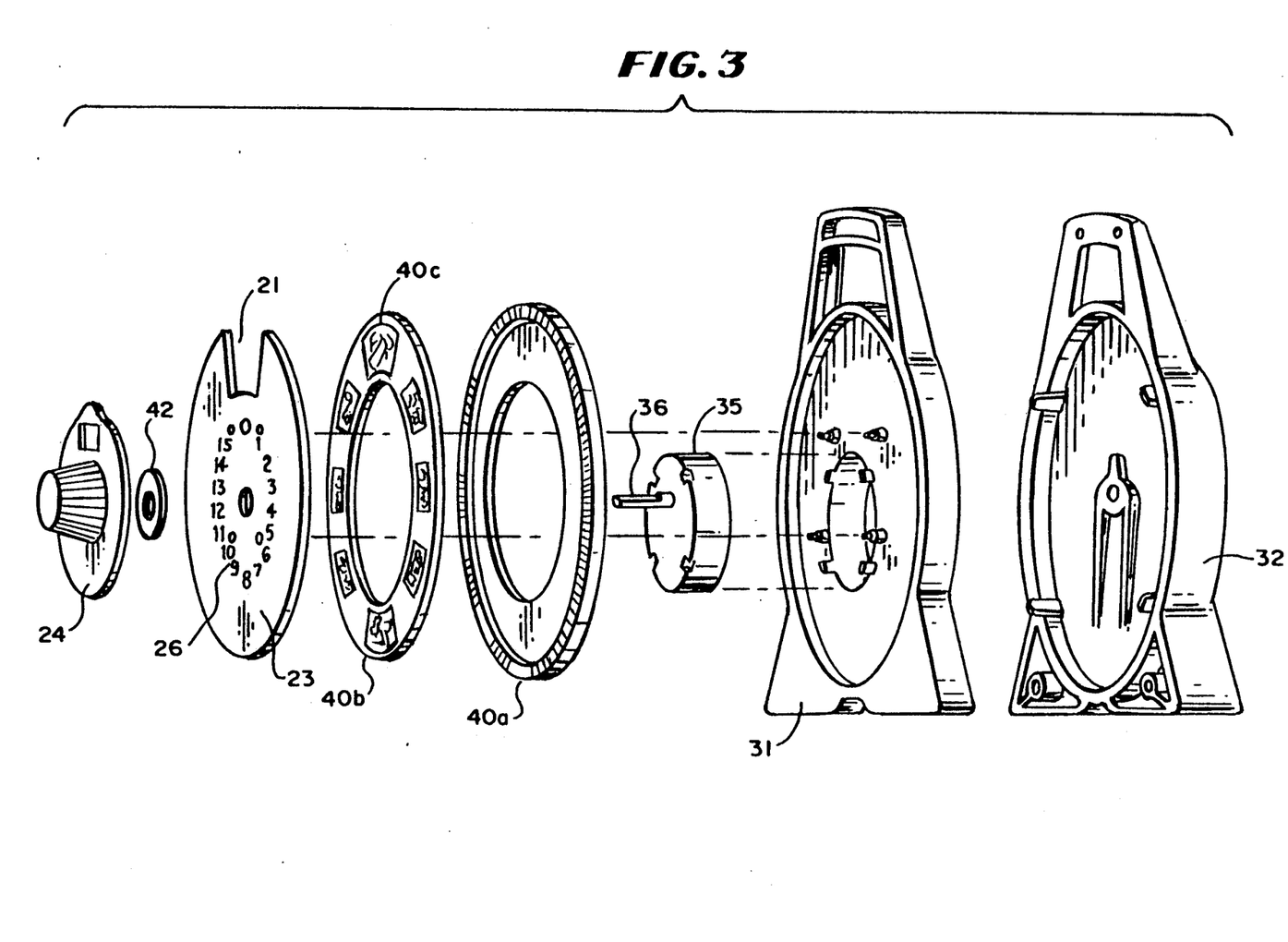
FIG. 3 is an exploded view of the embodiment of FIG. 1.

Referring now to the drawings, and particularly FIGS. 1-3 inclusive which illustrate a first embodiment of the invention, the numeral 20 generally designates such first form of the device. Device 20 is provided with a housing 22 which may be formed of plastic, metal or other material, having a front face plate 23, a top handle 25 for easy carrying of the device, and a widened base or feet 29 for standing the device upright. Numerals 26 are provided on the face plate as a time measure, but another graphic time measure could as easily be provided. A timer dial 24 is provided for setting the desired duration. The timer dial has an indicator means 27 which in the first embodiment is a window in the timer dial for indicating the change in duration length during the duration. Also provided is a window 21 in which is displayed a graphic illustration 28 or symbol representing the activity being timed or for which the child is waiting. The activity symbol is selected by rotating the activity ring 30.

FIGS. 2 and 3 illustrate in cross section and exploded view the relationship of the various parts of the first embodiment of the invention. As can be seen, the housing 20 is two sections 31 and 32 joined by a joining means 33. The housing contains the timer mechanism 34 having a base portion 35 and an oppositely disposed rotatable shaft portion 36 which projects away from the housing 20. The front portion of the housing has a generally planar portion 38 which has a plurality of anchoring pins 39 concentrically arranged around a centrally disposed opening. A ring shaped activity dial 40 fits rotatably about the periphery of the anchoring pins 39.

As can be seen in FIG. 3, the activity dial can have two parts, a supporting ring 40a and a changable ring 40b bearing a plurality of designs or symbols 40c representing various activities. Thus one could have an unlimited assortment of activity symbols by changing one changeable ring containing one set of symbols for another ring having another set of symbols. Alternatively, the changeable ring could be made of a material on which one could use an erasable crayon or marker so that symbols or designs could be hand drawn by the parent or the child. A related possibility is to use a paper or cardboard ring for the changable ring 40b or to use stickers or decals to change the activity symbols. Fitting over the activity dial and secured by the anchoring pins 39 is the face plate 23. The face plate of the first embodiment has on its outer side a time scale 26. The face plate also has a window or recessed portion 21 for displaying the particular activity symbol selected. In the embodiment illustrated in FIGS. 1 and 3 the time scale is represented by numerals but it could be represented by colored lines or other means. Finally, a timer dial 24 is fitted on the free end of the shaft portion 37. A spacer washer 42 is provided to seperate the timer dial 24 from the face plate 23 to facilitate turning of the dial.

The timer mechanism of the invention is a spring wound timer. The shaft portion 36 is coupled to the spring so that when the shaft is rotated in one direction the spring is wound. Releasing the spring permits it to unwind, rotating the shaft in the opposite direction. A timer mechanism is selected in which the spring will unwind at a defined rate and the time scale on the face plate will correlate with the rate of unwinding of the spring of the timer mechanism. A variety of suitable timer mechanism are readily available commerically. Examples of such mechanisms are available from the following companies: Robert Shaw Controls, a Division of Borg Instruments of Youngwood, Pa.; Dichl Controls, a Division of Borg Instruments of Delavan, Wis.; or M. H. Rhodes, Inc. of Avon, Conn. In the preferred embodiment a 15 minute timer mechanism is used.

In operating the present invention as described in the first embodiment, an activity symbol 40c is selected by rotating the activity dial 40 until the desired symbol is displayed in the window 21. Then the timer dial is rotated to the desired duration length which winds the spring of the timer mechanism. When the dial is released, the unwinding of the spring causes the timer dial to rotate back at a defined rate which correlates with the selected duration being timed.

EXAMPLE 2

Figure 4:
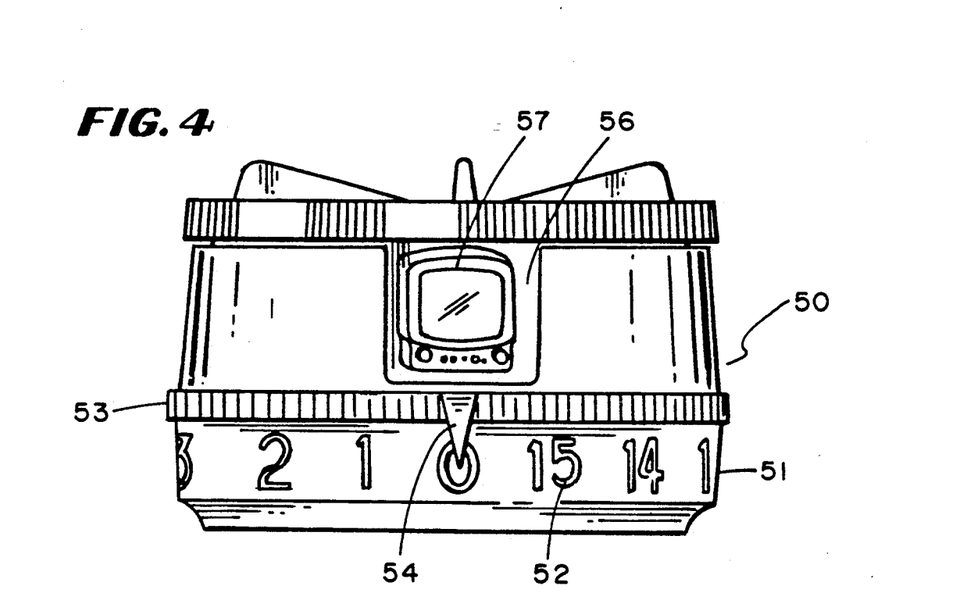
FIG. 4 is a front elevational view of a second embodiment contemplated by the invention.
Figure 5:
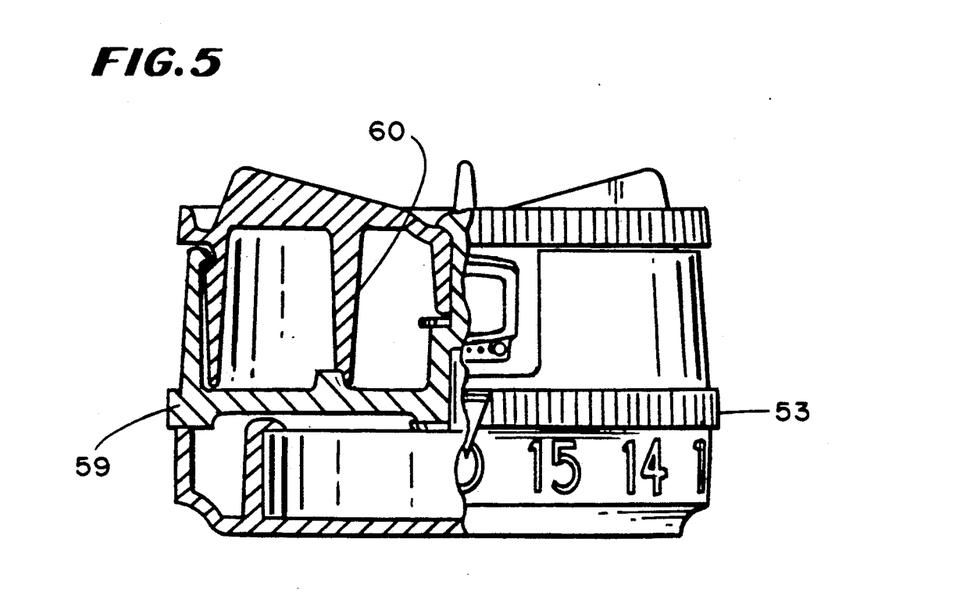
FIG. 5 is a partial cross section of FIG. 4.
Figure 6:
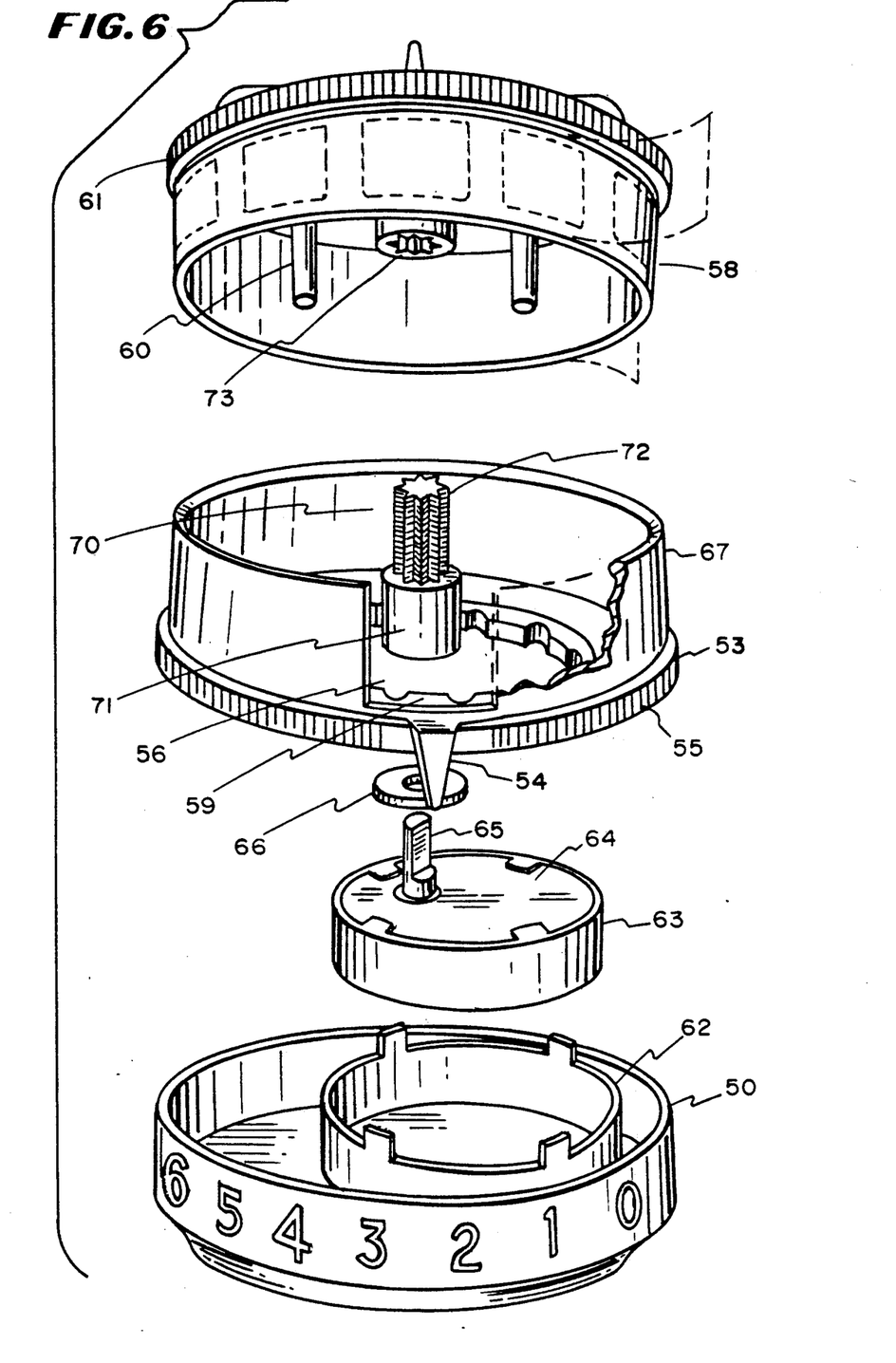
FIG. 6 is an exploded view of FIG. 4.

Turning now to FIGS. 4 though 6 which describe a second embodiment of the invention, the numeral 50 generally designates such second form of the device. Device 50 is provided with a housing member 51 which may be formed of plastic, metal or other material, having a time scale displayed on its outside surface. This time scale may be in the form of numerals or some other graphic representation which would be understood by the parent or child to demarcate segments of time. A timer dial 53 is provided for setting a desired duration. The timer dial has an indicator means 54 which in the second embodiment is a pointer on the timer dial for indicating the change in duration length during the duration. As can be seen in FIG. 6, the timer dial has a grasping means 55 which in the second embodiment is a raised area or ribbed area which can be easily gripped between the thumb and fingers of a child in order to rotate the dial and set the duration. The timer dial of the second embodiment has a cylinder-like portion 67 which has an opening therein 56 for displaying an activity symbol or graphic representation of the activity 57 being timed or for which the child is waiting. An activity selector 58 is provided, which in the second embodiment, is a ring-like member which fits within the cylinder of the timer dial. The timer dial is provided in the second embodiment with a detent ring 59 which engages detent pins 60 provided on the activity selector. Thus, in the second embodiment, in order to change the activity symbol being displayed in the opening of the timer dial, one simply lifts the activity selector and rotates it until the desired activity symbol is displayed, at which point the detent pins 60 are engaged with the detent ring 59. For ease of lifting and rotating a raised or ridged lip is provided about the top of the activity selector 61. FIG. 6 also illustrates that the activity symbols are displayed on the outside surface of the activity selector. These symbols can be placed on the outside surface by use of decals, imprints into the material which comprises the activity selector or hand-painted on the activity selector.

The housing member of the activity selector is provided with a containment housing 62 for the timer mechanisms 63. The timer mechanism has a base portion 64 and a shaft portion 65. The mechanism is placed within the containment housing so that the shaft portion projects out of the housing member 50. In the second embodiment of the invention a sleeve 70 is provided which fits over the shaft 65 of the timer mechanism. In the second embodiment, a washer 66 fits over the shaft first, followed by the sleeve. The use of the washer is to facilitate rotating of the shaft with the sleeve fitted snugly on it. The sleeve of the second embodiment has a base portion 71 and a toothed stem portion 72. The stem portion is designed so as to interlock with a centrally disposed female receptacle 73 formed inside the activity selector. As can be seen in FIG. 6, the second embodiment is assembled by placing the timer mechanism 63 inside the containment housing 62. The timer dial 53 is then fitted over the housing member 50. The timer dial is adapted so as to generally conform to the shape of the housing member 50. The timer dial has a centrally disposed opening through which the shaft 65 of the timer mechanism 63 projects. The washer 66 is then placed over the shaft followed by the sleeve 70.

The activity selector 58 is then fitted inside the timer dial 53 so that the detent pins 60 are engaged with the detent ring 59 and the toothed stem 72 interdigitates with the female receptacle of the activity dial 58. The interrelationship of the detent pins 60 and the detent ring 59 and the toothed stem 72 and the female receptacle 73 are such that the device can be assembled so as to display one activity symbol 57 in the window 56 at a time. Activity symbols are changed by lifting the activity dial 58 so as to discharge the detent ring 59 and the toothed shaft 72 and rotating the activity dial to the next desired symbol.

In operation, the second embodiment functions by setting the activity symbol as described above, and then rotating the timer dial 53 to the desired time duration. When the timer dial is released, the timer mechanism 63 causes the timer shaft 65 to rotate in the opposite direction. The toothed shaft 72 will likewise rotate and cause the activity dial 58 to rotate. This in turn will cause the timer dial 53 to rotate because the detent pins 60 will be interlocked with the detent ring 59. As the timer dial 53 rotates, the pointer 54 indicates the amount of time remaining. Because the timer dial 53 and the activity selector 58 are interlocked, they will move together, thus permitting the activity symbol to be displayed throughout the duration.

EXAMPLE 3

Figure 7:
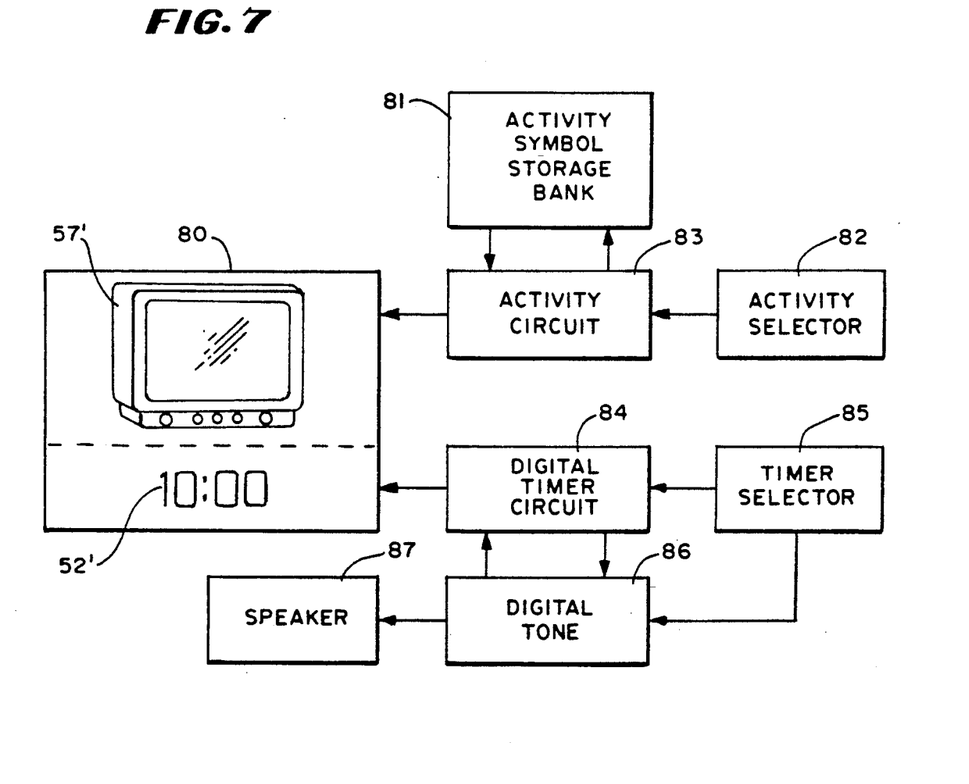
FIG. 7 is a flow chart diagram of another embodiment of the invention.

A third embodiment of the invention is illustrated in FIG. 7. Here the activity symbol 57' and the duration indicator 52' are displayed on either a video display 80 or alternatively, a LED display. Activity symbols or graphic representations are stored in a computer memory storage bank 81. An activity selector sends an appropriate signal to the activity circuit 83. The circuit inputs a signal to the storage bank 81 and retrieves the appropriate activity symbol signal which signal is then output to the video display causing the desired symbol or graphic representation to be displayed 57'.

A digital timer circuit 84 is employed which is activated by an input signal from the timer selector 85. On activation, the digital timer circuit causes a digital time display 52' to be made on the video or LED display. As illustrated in FIG. 7, the digital timer circuit 84 is also connected to a digital tone circuit 86 which is designed to announce the end of the selected duration by outputting a tone signal to a speaker 87.

What we claim is:

1. An apparatus, comprising:
   (a) a means for timing a duration of pre-selected length;
   (b) a means for displaying, in a stationary position, during said duration at least one of a plurality of symbols wherein each said symbol represents an activity;
   (c) a means for indicating when said duration is ended.

2. An apparatus as claimed in claim 1, wherein said means for timing includes a mechanical timer.

3. An apparatus as claimed in claim 1, wherein said means for timing includes an electronic timer.

4. An apparatus as claimed in claim 1, wherein said means for displaying symbols is an activity dial on which a plurality of activities are graphically displayed.

5. An apparatus as claimed in claim 1, wherein said means for displaying symbols is an LED display.

6. An apparatus as claimed in claim 1, wherein said means for indicating when said duration is ended is a mechanical sound means.

7. An apparatus as claimed in claim 1, wherein said means for indicating when said duration is ended is an electronic sound means.

8. An apparatus as claimed in claim 1, further comprising a means for indicating the change in duration length during said duration.

9. An apparatus, comprising:
   (a) a means for timing a duration of pre-selected length;
   (b) a means for indicating the change in duration length during said duration.
   (c) a means for displaying, in a stationary position, during said duration at least one of a plurality of symbols wherein each said symbol represents an activity;
   (d) a means for indicating when said duration is ended.

10. An apparatus as claimed in claim 9, wherein said means for timing includes a mechanical timer.

11. An apparatus as claimed in claim 9, wherein said means for timing includes an electronic timer.

12. An apparatus as claimed in claim 9, wherein said means for displaying symbols is an activity dial on which a plurality of activities are graphically displayed.

13. An apparatus as claimed in claim 9, wherein said means for indicating when said duration is ended is a sound means.

14. A child activity timer, comprising:
   (a) a spring driven timer mechanism for timing a duration of pre-selected length, said timer mechanism having a base portion and an oppositely disposed rotatable shaft portion, said shaft portion having an attached end and a free end, said timer mechanism having a winding spring operably coupled to said attached end and adapted so that rotating said rotatable shaft in one direction winds said spring and when wound and released said spring rotates said shaft in the opposite direction;
   (b) a housing member which encloses the base portion of said timer mechanism such that said shaft portion projects away from said housing member said housing member having on its outside surface a time scale;
   (c) a timer dial, said timer dial having a grasping means and an indicator means, said timer dial fitted by attachment means on said free end of said shaft portion such that said shaft can be rotated so as to wind said spring a desired amount by gripping said grasping means and turning said dial and when said spring rotates said shaft in the opposite direction said indicator means moves in relation to said time scale.
   (d) an activity selector means which fits adjacent to said housing or said dial and permits the stationary display of one of a plurality of activity symbols during said duration.

15. A child activity timer, comprising:
   (a) a spring driven timer mechanism for timing a duration of pre-selected length, said timer mechanism having a base portion and an oppositely disposed rotatable shaft portion, said shaft portion having an attached end and a free end, said timer mechanism having a winding spring operably coupled to said attached end and adapted so that rotating said rotatable shaft in one direction winds said spring and when wound and released said spring rotates said shaft in the opposite direction;
   (b) a housing member which encloses the base portion of said timer mechanism, said housing having a generally planar portion, said planar portion having a plurality of anchoring pins concentrically arranged around a centrally disposed opening through which said shaft portion protrudes;
   (c) a ring shaped activity dial having an inside surface and an outside surface and a center opening, said dial fitted rotatably on said planar portion about the periphery of said concentrically arranged anchoring pins such that said inside surface is adjacent said planar surface, said activity dial having on its outside surface a plurality of evenly spaced activity symbols;
   (d) a timer face plate, said plate having an inner side, an outer side, a peripheral opening, a centrally disposed hole of slightly greater diameter than said rotatable shaft, said plate secured by said anchoring pins so that said activity dial is rotatably secured between said planar portion and said inner side of said plate, said plate being positioned such that an activity symbol can be made to appear in said peripheral opening by rotating said activity dial and remains in said opening during said duration said plate having a time scale depicted on said plate's outer side;

(e) a timer dial, said timer dial having a grasping means and an indicator means, said timer dial fitted by attachment means on said free end of said shaft portion such that said shaft can be rotated so as to wind said spring a desired amount and when said spring rotates said shaft in the opposite direction said indicator means moves in relation to said time scale.

16. A child activity timer as claimed in claim 15, further comprising a sound means to indicate when said predetermined duration is ended.

17. A child activity timer, comprising:

(a) a spring driven timer mechanism for timing a duration of pre-selected length, said timer mechanism having a base portion and an oppositely disposed rotatable shaft portion, said shaft portion having an attached end and a free end, said timer mechanism having a winding spring operably coupled to said attached end and adapted so that rotating said rotatable shaft in one direction winds said spring and when wound and released said spring rotates said shaft in the opposite direction;

(b) a generally circular housing member which encloses the base portion of said timer mechanism such that said shaft portion projects away from said housing member, said housing member having on its outside surface a time scale;

(c) a cylinder-like timer ring fitted rotatably to the outside edge of said housing member and encircling said shaft, said timer ring having a grasping means, an indicator means, and a peripheral window, said timer ring connected by attachment means to said free end of said shaft portion such that turning said ring by said grasping means rotates said shaft so as to wind said spring a desired amount and when said spring rotates said shaft in the opposite direction said indicator means moves in relation to said time scale;

(d) a tube shaped activity selector which rotatably fits inside said timer ring, said activity selector having on its outside surface a plurality of evenly spaced activity symbols positioned so that by rotating said selector an activity symbol can be made to appear in said window and remains in said opening during said duration.

18. A child activity timer as claimed in claim 17, further comprising a sound means to indicate when said predetermined duration is ended.

19. A method for teaching a young child the concept of time, comprising the steps of:

(a) timing a duration of pre-selected length;
(b) graphically displaying for said child the change in duration length during said duration.
(c) displaying for said child during said duration a stationary graphic representation of the activity being timed or the activity for which the child is waiting;
(d) indicating when said duration is ended.

* * * * *